(12) United States Patent
Webster et al.

(10) Patent No.: US 8,320,720 B2
(45) Date of Patent: Nov. 27, 2012

(54) ADVANCED MODULATION FORMATS FOR SILICON-BASED OPTICAL MODULATORS

(76) Inventors: Mark Webster, Bethlehem, PA (US); Anujit Shastri, Orefield, PA (US); Kalpendu Shastri, Orefield, PA (US)

( * ) Notice: Subject to any disclaimer, the term of this patent is extended or adjusted under 35 U.S.C. 154(b) by 175 days.

(21) Appl. No.: 12/856,144

(22) Filed: Aug. 13, 2010

(65) Prior Publication Data
US 2011/0044573 A1 Feb. 24, 2011

Related U.S. Application Data

(60) Provisional application No. 61/235,106, filed on Aug. 19, 2009, provisional application No. 61/355,374, filed on Jun. 16, 2010.

(51) Int. Cl.
*G02B 6/12* (2006.01)
(52) U.S. Cl. .......................................................... 385/14
(58) Field of Classification Search .................. 385/2, 3, 385/8, 9, 14
See application file for complete search history.

(56) References Cited

U.S. PATENT DOCUMENTS

| | | | |
|---|---|---|---|
| 7,027,669 B2 * | 4/2006 | Leuthold et al. .................. | 385/3 |
| 7,061,414 B2 * | 6/2006 | Chen et al. ..................... | 341/137 |
| 7,272,271 B2 | 9/2007 | Kaplan et al. | |
| 7,483,597 B2 | 1/2009 | Shastri et al. | |
| 7,515,778 B2 | 4/2009 | Mosinskis et al. | |
| 7,636,501 B2 * | 12/2009 | Doerr et al. ....................... | 385/3 |
| 7,873,284 B2 * | 1/2011 | Chen et al. ..................... | 398/183 |
| 8,044,835 B2 * | 10/2011 | Ehrlichman et al. .......... | 341/137 |
| 2010/0156679 A1 | 6/2010 | Ehrlichman et al. | |

OTHER PUBLICATIONS

Shich et al., "Coherent optical OFDM: theory and design", Jan. 21, 2008/vol. 16, No. 2/Optics Express, pp. 841-859.
Barros et al., "Optical Modulator Optimization for Orthogonal Frequency-Division Multiplexing", Journal of Lightwave Technology, vol. 27, No. 13, Jul. 1, 2009, pp. 2370-2378.
Lowery et al., "Performance of Optical OFDM in Ultralong-Haul WDM Lightwave Systems", Journal of Lightwave Technology, vol. 25, No. 1, Jan. 2007, pp. 131-138.
Tang et al., "Optimum Design for RF-to-Optical Up-Converter in Coherent Optical OFDM Systems", IEEE Photonics Technology Letters, vol. 19, No. 7, Apr. 1, 2007, pp. 483-485.
Armstrong, "OFDM for Optical Communications", Journal of Lightwave Technology, vol. 27, No. 3, Feb. 1, 2009, pp. 189-204.
Ehrlichman, Y., "Photonic Digital to Analog Conversion", Electrical and Electronics Engineers in Israel (IEEEI 2008), pp. 190-193, Dec. 3-5, 2008, Abstract; Figure 1.

* cited by examiner

*Primary Examiner* — Daniel Petkovsek
(74) *Attorney, Agent, or Firm* — Wendy W. Koba

(57) ABSTRACT

A silicon-based optical modulator is configured as a multi-segment device that utilizes a modified electrical data input signal format to address phase modulation nonlinearity and attenuation problems associated with free-carrier dispersion-based modulation. The modulator is formed to include M separate segments and a digital signal encoder is utilized to convert an N bit input data signal into a plurality of M drive signals for the M modulator segments, where $M \geq 2^N/2$. The lengths of the modulator segments may also be adjusted to address the nonlinearity and attenuation problems. Additional phase adjustments may be utilized at the output of the modulator (beyond the combining waveguide).

10 Claims, 6 Drawing Sheets

US 8,320,720 B2

ADVANCED MODULATION FORMATS FOR SILICON-BASED OPTICAL MODULATORS

CROSS-REFERENCE TO RELATED APPLICATIONS

This application claims the benefit of U.S. Provisional Application No. 61/235,106 filed Aug. 19, 2009 and U.S. Provisional Application No. 61/355,374, filed Jun. 16, 2010, both of which are herein incorporated by reference.

TECHNICAL FIELD

The present invention relates to silicon-based optical modulators and, more particularly, to a segmented silicon-based optical modulator utilizing a digital encoder for mapping a multi-bit input data signal into a plurality of signals for driving the separate modulator segments in a combination that is selected to address performance problems (e.g., attenuation) associated with unique properties of silicon-based modulators.

BACKGROUND OF THE INVENTION

For many years, optical modulators have been made out of electro-optic material, such as lithium niobate. Optical waveguides are formed within the electro-optic material, with metal contact regions disposed on the surface of each waveguide arm. A continuous wave (CW) optical signal is launched into the waveguide, and an electrical data signal input is applied as an input to the metal contact regions. The applied electrical signal modifies the refractive index of the waveguide region underneath the contact, thus changing the speed of propagation along the waveguide. By applying the voltage(s) that produce a π phase shift between the two arms, a nonlinear (digital) Mach-Zehnder modulator is formed.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform. Moreover, it is well-known that any of these field-based devices have inherent performance limitations at data rates exceeding, for example, 1 GB/s. In particular, lithium niobate-based arrangements need to be modeled as traveling wave structures, with relatively complex electrical drive structures required to attempt to have the device operate at the requisite speed.

A significant advance has been made in the ability to provide optical modulation in a silicon-based platform, as disclosed in U.S. Pat. No. 6,845,198 issued to R. K. Montgomery et al. on Jan. 18, 2005, assigned to the assignee of this application and incorporated herein by reference. FIG. 1 illustrates one exemplary arrangement of a silicon-based modulator device as disclosed in the Montgomery et al. patent. In this case, a silicon-based optical modulator 1 comprises a doped silicon layer 2 (typically, polysilicon) disposed in an overlapped arrangement with an oppositely-doped portion of a sub-micron thick silicon surface layer 3 (often referred to in the art as an SOI layer). SOI layer 3 is shown as the surface layer of a conventional silicon-on-insulator (SOI) structure 4, which further includes a silicon substrate 5 and a buried oxide layer 6. Importantly, a relatively thin dielectric layer 7 (such as, for example, silicon dioxide, silicon nitride, potassium oxide, bismuth oxide, hafnium oxide, or other high-dielectric-constant electrical insulating material) is disposed along the overlapped region between SOI layer 3 and doped polysilicon layer 2. The overlapped area defined by polysilicon layer 2, dielectric 7 and SOI layer 3 defines the "active region" of optical modulator 1. In one embodiment, polysilicon layer 2 may be p-doped and SOI layer 3 may be n-doped; the complementary doping arrangement (i.e., n-doped polysilicon layer 2 and p-doped SOI layer 3) may also be utilized.

FIG. 2 is an enlarged view of the active region of modulator 1, illustrating the optical intensity associated with a signal propagating through the structure (in a direction perpendicular to the paper) and also illustrating the width W of the overlap between polysilicon layer 2 and SOI layer 3. In operation, free carriers will accumulate and deplete on either side of dielectric layer 7 as a function of the voltages (i.e., the electrical data input signals) applied to doped polysilicon layer 2 ($V_{REF2}$) and SOI layer 3 ($V_{REF3}$). The modulation of the free carrier concentration results in changing the effective refractive index in the active region, thus introducing phase modulation of an optical signal propagating along a waveguide defined by the active region. In the diagram of FIG. 2, the optical signal will propagate along the y-axis, in the direction perpendicular to the paper.

FIG. 3 illustrates an exemplary prior art silicon-based Mach-Zehnder interferometer (MZI) 10 that is configured to utilize silicon-based modulating devices 1 as described above. As shown, prior art MZI 10 comprises an input waveguide section 12 and an output waveguide section 14. A pair of waveguiding modulator arms 16 and 18 are shown, where in this example waveguide arm 16 is formed to include a modulating device 1 as described above.

In operation, an incoming continuous wave (CW) light signal from a laser source (not shown) is coupled into input waveguide section 12. The CW signal is thereafter split to propagate along waveguide arms 16 and 18. The application of an electrical drive signal to modulator 1 along arm 16 will provide the desired phase shift to modulate the optical signal, forming a modulated optical output signal along output waveguide 14. A pair of electrodes 20 are illustrated in association with modulator 1 and used to provide the electrical drive signals ($V_{REF2}$, $V_{REF3}$). A similar modulating device may be disposed along waveguiding arm 18 to likewise introduce a phase delay onto the propagating optical signal. When operating in the digital domain, the electrodes may be turned "on" when desiring to transmit a logical "1" and then turned "off" to transmit a logical "0".

To the first order, the output power of a conventional modulator as shown above is given by the equation:

$$P_{out}=P_{in}/2(1+\cos \Delta\phi),$$

where $P_{out}$ is the output power from the modulator, $P_0$ is the input power, and $\Delta\phi$ is the net optical phase difference between the two arms (e.g., arms 16 and 18 of modulator 10 of FIG. 3). As a result, the optical output power level is controlled by changing the value of the net phase shift $\phi$ between the two arms. FIG. 4 is a plot of this relationship, illustrating the output power as a function of phase shift between the two arms (a "1" output associated with maximum output power $P_{out}$ and a "0" output associated with minimum output power $P_{out}$). That is, a differential phase shift between the two arms of the modulator provides either constructive interference (e.g., "1") or destructive interference (e.g., "0"). Although not shown or described, it is to be understood that in implementation such a modulator may utilize a DC section to optically balance the arms and set the operating point at a desired location along the transfer curve shown in FIG. 4.

There have also been advances in the art of silicon-based optical modulators in terms of utilizing advanced signaling formats. See, for example, U.S. Pat. No. 7,483,597 issued to K. Shastri et al. on Jan. 27, 2009, assigned to the assignee of this application and herein incorporated by reference. As disclosed therein, a multi-bit electrical input data is used and the modulator itself is configured to include at least one modulator arm comprising multiple sections of different lengths, with the total length being equal to one $\pi$ phase shift. One such exemplary modulator 25 is shown in FIG. 5. Each separate section is driven with an digital logic "1" or a digital logic "0", that is, digitally driven to either be "on" or "off", creating the multi-level modulation.

It is known that each modulator section can be optimized in terms of nominal length to provide nearly equal power levels in absolute value, regardless of the position of the section along the modulator arm (i.e., its "position" relative to the cosine-based power curve). Referring again to the transfer function curve of FIG. 4, it is clear that longer length modulation sections are needed to operate at the peak and valley of the cosine curve and provide the same output power change as sections associated with the "steeper", central area of the transfer curve.

While the arrangement disclosed in Shastri et al. is useful for allowing a multi-bit data signal to drive a silicon-based optical modulator, it has been recognized that the free-carrier dispersion effect utilized for optical phase modulation in silicon exhibits a nonlinear phase modulation response, while also exhibiting attenuation that is proportional to the amount of phase modulation. FIG. 6(a) is a plot of the nonlinear phase modulation response versus applied voltage and FIG. 6(b) is a plot of attenuation of a silicon-based optical modulator as a function of applied voltage for the prior art device of FIG. 5. As shown in FIG. 6(a), the phase modulation is nonlinear for applied voltages less than about one volt, where the attenuation as shown in FIG. 6(b) increases as the applied voltage increases, reaching a value approaching 3 dB/mm for an applied voltage of 2V and an operating wavelength of 1550 nm.

Thus, a need remains in the art for a silicon-based optical modulator that recognizes and addresses the nonlinearity and attenuation problems associated with the free-carrier dispersion effect in these silicon devices.

SUMMARY OF THE INVENTION

The need remaining in the prior art is addressed by the present invention, which relates to silicon-based optical modulators and, more particularly, to a silicon-based optical modulator that is configured as a multi-segment device that utilizes a modified electrical data input signal format to address phase modulation nonlinearity and attenuation problems associated with free-carrier-dispersion based modulation along its waveguiding regions.

In accordance with the present invention, the nonlinear phase modulation and free carrier-based dispersion-based attenuation are mitigated by utilizing a multiple segment modulator structure, where for an N bit input signal, an M segment modulator is employed, where $M \geq 2^N/2$. An N-to-M digital encoder is included in the modulator arrangement and used to map the N bit input signal into the desired M signals used to selectively drive the modulator segments.

It is an aspect of the present invention that the lengths of the modulator segments may also be adjusted to address the nonlinearity and attenuation problems. Additional phase adjustments may be utilized at the output of the modulator (beyond the combining waveguide).

Advantageously, the inclusion of multiple modulator segments controlled by an encoding of the digital input signal allows for the inputs to the segments themselves to take the form of digital signals, allowing for a CMOS-based configuration to be utilized.

The modulator of the present invention is considered to be useful with a variety of advanced modulation schemes including, but not limited to, quadrature amplitude modulated (QAM), QAM-m, star-QAM, quadrature phase shift keying (QPSK), PAM (phase amplitude modulation), OFDM (orthogonal frequency division multiplexing), and the like.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 7:
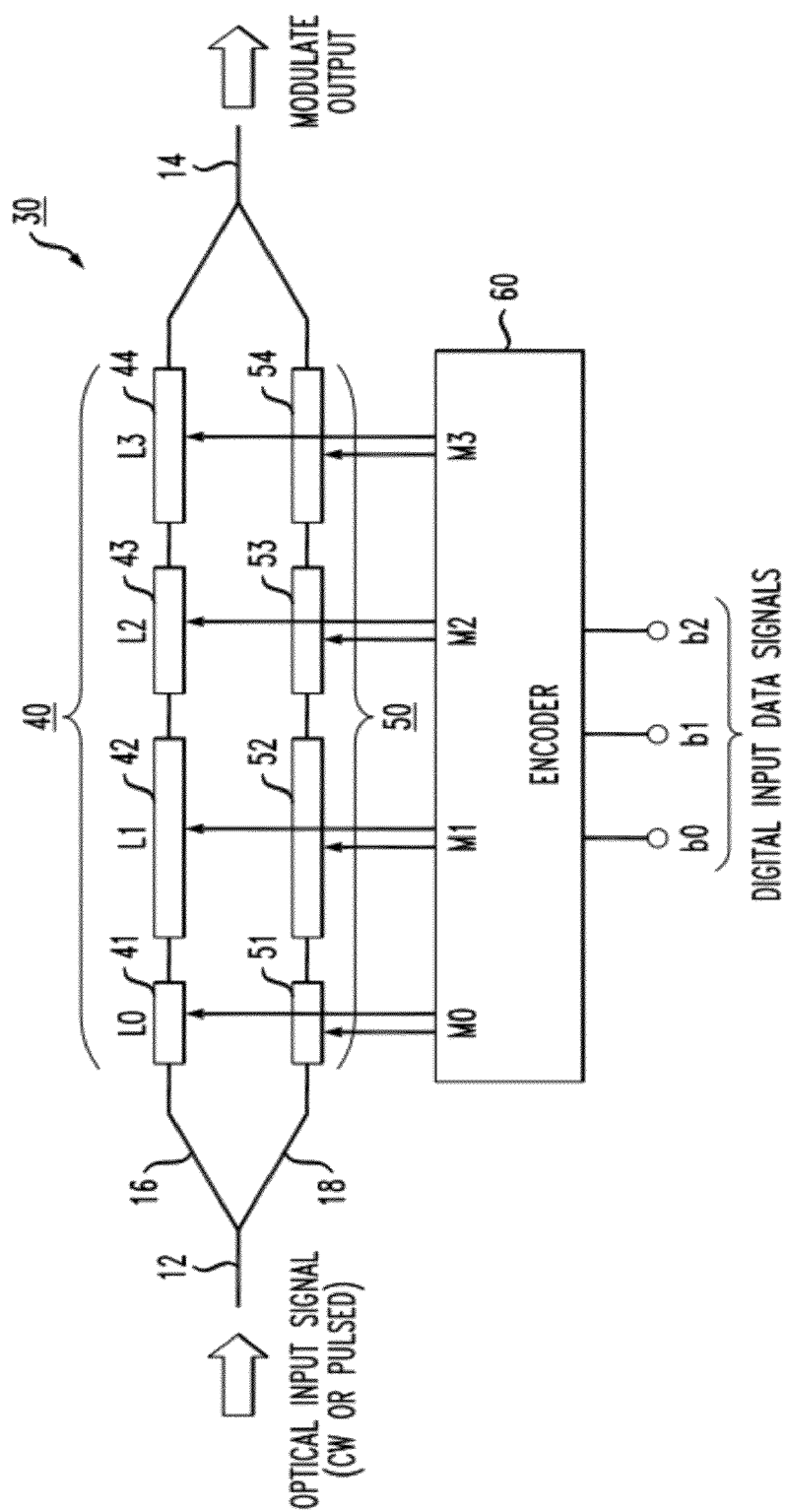
FIG. 7 shows an exemplary segmented, silicon-based optical modulator formed in accordance with the present invention to provide encoding of the electrical data input signal to overcome the phase nonlinearity and attenuation problems associated with the prior art.

FIG. 7 illustrates an exemplary silicon-based optical modulator 30 formed in accordance with the present invention to address the nonlinearity and attenuation problems associated with the use of free carrier dispersion-based modulation in a multi-segment modulator configuration. As shown, modulator 30 comprises the same MZI architecture as discussed above, including an input waveguide 12, output waveguide 14 and a pair of waveguiding arms 16, 18. A CW optical signal is coupled into input waveguide 12 and a "modulated" optical signal appears along output waveguide 14, the modulation introduced by an electrical input (data) signal applied as an input to modulating devices disposed along waveguide arms 16, 18. Each waveguide arm 16, 18 is shown as comprising multiple segments, with the electrical (data) input signals used to control the degree of phase modulation introduced into the propagating optical signal.

Figure 1:
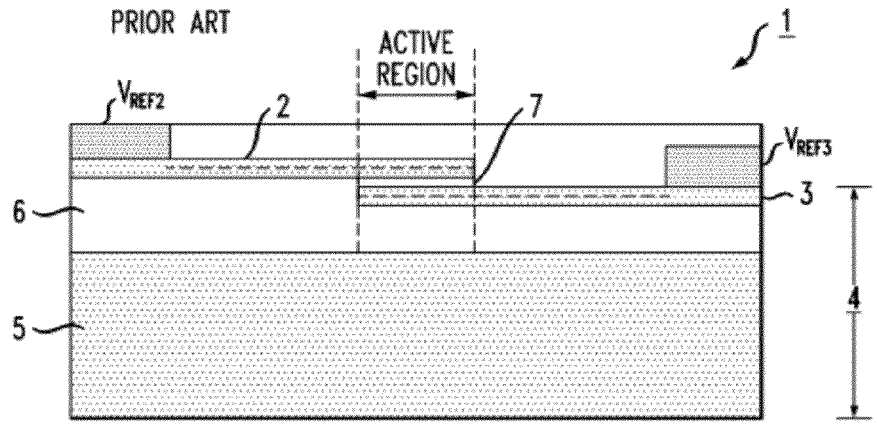
FIG. 1 is a cut-through sectional view of an exemplary silicon-based modulating device.
Figure 2:
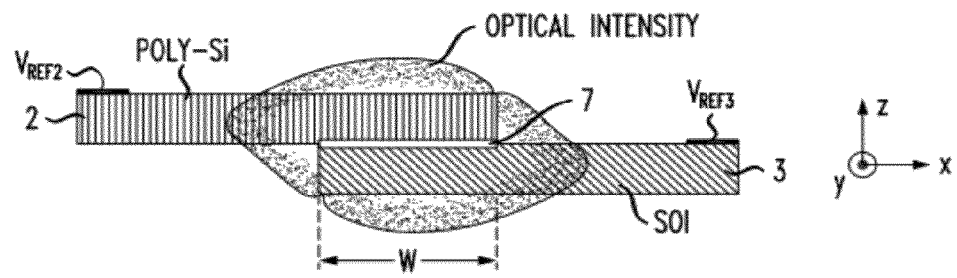
FIG. 2 is an enlarged view of the active region of the device illustrated in FIG. 1.
Figure 3:
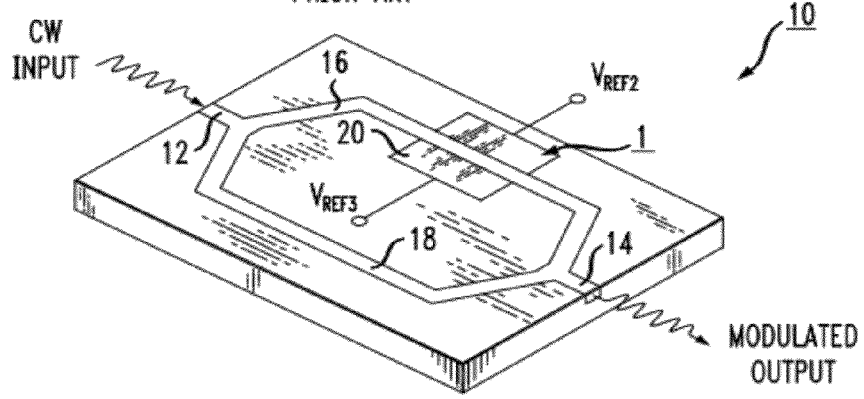
FIG. 3 illustrates an exemplary Mach-Zehnder interferometer (MZI) utilizing the silicon-based modulating device of FIG. 1.
Figure 4:
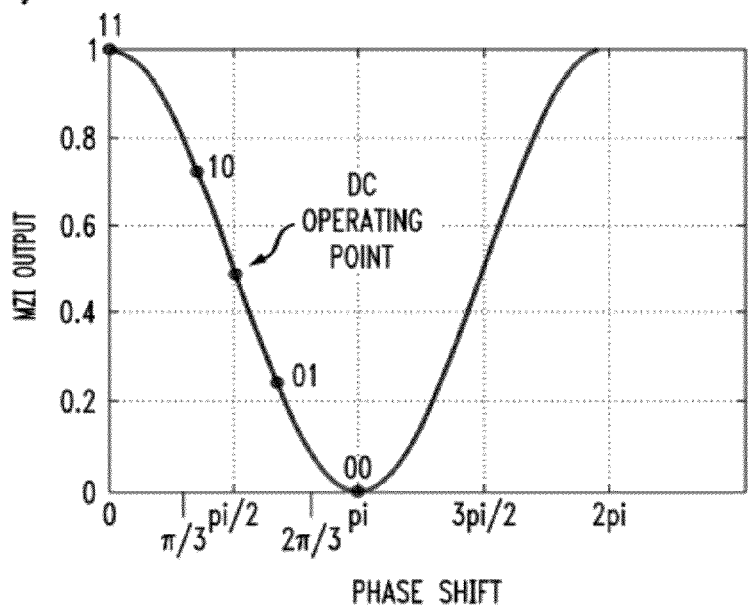
FIG. 4 shows the transfer function of the MZI of FIG. 3.
Figure 5:
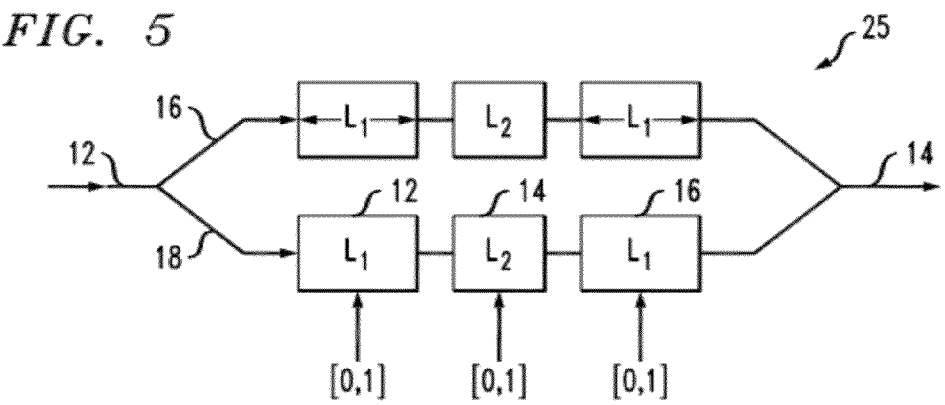
FIG. 5 illustrates an exemplary segmented MZI for use with a multi-level electrical input (data) signal.

In particular, optical waveguide arm 16 is shown as comprising a first plurality of segments 40, in this case a set of four segments 41, 42, 43 and 44 of various lengths (shown as L0, L1, L2 and L3 in FIG. 7), although more than four segments can be used. The segment lengths are prescribed, in particular, on design criteria described hereinbelow, including compensating for nonlinear phase modulation and free-carrier induced attenuation. Optical waveguide arm 18 is shown as formed as a second plurality of segments 50 (including, again, four segments 51, 52, 53 and 54 of prescribed lengths). Each segment may be formed similar to the configuration of modulator 1 as shown in FIGS. 1-3; alternatively, a P-N junction silicon-based modulator as also known in the art may be utilized in the modulator of the present invention.

In accordance with the present invention, an input signal encoder 60 is used to convert a set of N input electrical data signal bits into a set of M electrical drive signals used to the control first and second pluralities of segments 40 and 50. As noted above, the number of segments M is related to the number of bits N by the relation $M \geq 2^N/2$. For the exemplary embodiment of FIG. 7, N=3 and M=4. Input signal encoder 40 functions to map the eight possible input conditions from the three-bit input electrical data signal (b0, b1, b2) into control signals (M0, M1, M2, M3) for segments 20, 30. It is advantageous that the outputs are also digital signals, allowing for CMOS-based circuit elements to be used in the fabrication of the modulator. Table I, shown below, illustrates one exemplary encoding scheme that may be used to create control signals M0-M3:

TABLE I

| b2 | b1 | b0 | M0  | M1  | M2  | M3  |
|----|----|----|-----|-----|-----|-----|
| 0  | 0  | 0  | off | off | off | off |
| 0  | 0  | 1  | on  | off | off | off |
| 0  | 1  | 0  | on  | on  | off | off |
| 0  | 1  | 1  | on  | on  | on  | off |
| 1  | 0  | 0  | off | off | off | on  |
| 1  | 0  | 1  | off | off | on  | on  |
| 1  | 1  | 0  | off | on  | on  | on  |
| 1  | 1  | 1  | on  | on  | on  | on  |

In this case, input signal encoder 60 maps the eight possible input conditions of the three-bit electrical data input signal into eight of the possible sixteen output states for control signals M0-M3. The judicious choice of the "best" eight states allows for the silicon-based modulator to overcome the nonlinear phase response and attenuation problems associated with free carrier dispersion-based modulation. It is to be understood that although not explicitly shown in this table or in the associated drawings, each one of the M control signals applied to the modulator segments actually comprises a pair of oppositely-biased signals. Moreover, it is to be understood that an additional, constant phase bias is applied to modulator 30 so as to allow it to function at the desired operating point.

Figure 8:
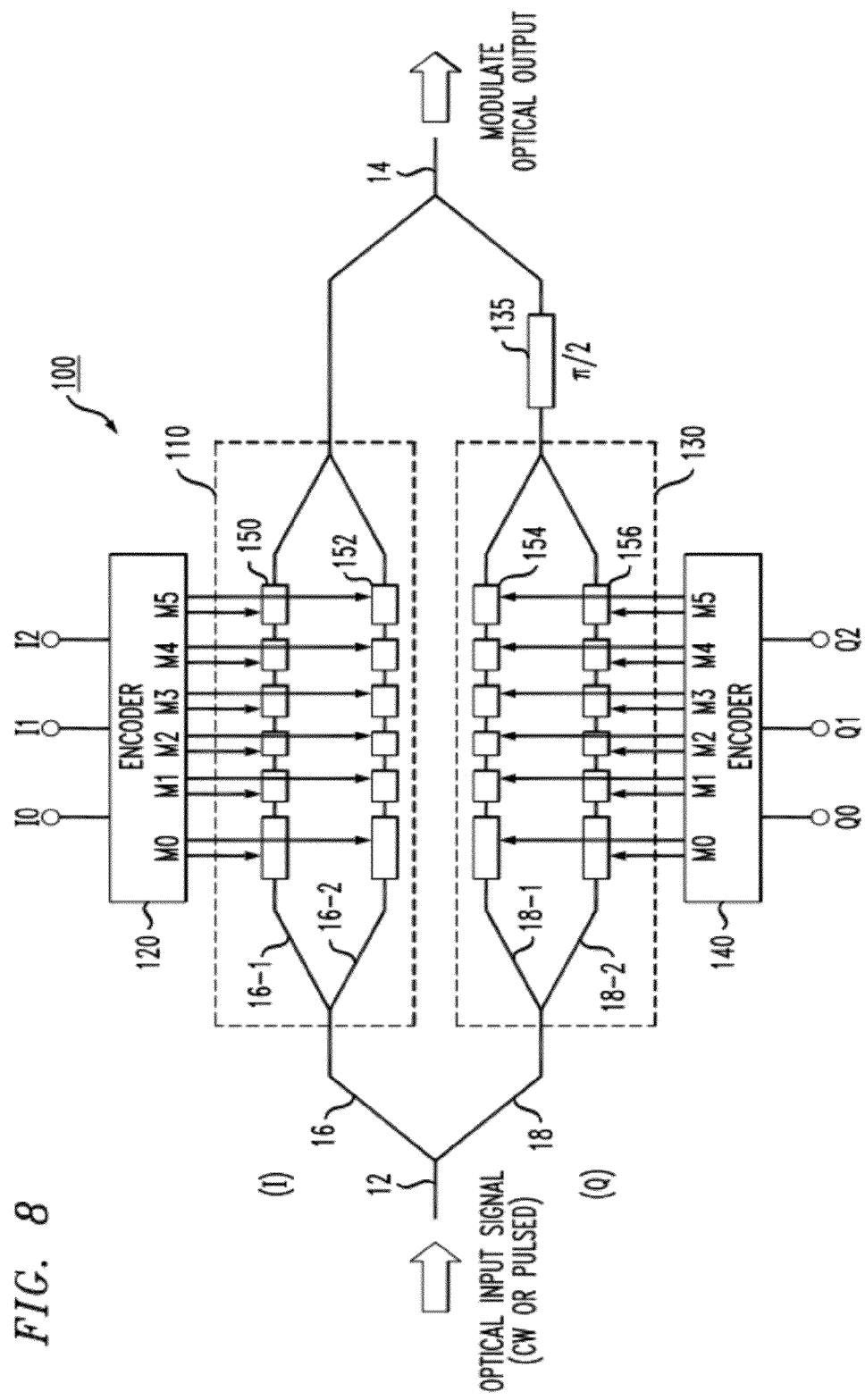
FIG. 8 is an exemplary QAM modulator formed in accordance with the present invention.

FIG. 8 illustrates an embodiment of the present invention as configured for a QAM optical modulator 100. In this case, waveguide 16 is shown as associated with the in-phase (I) component of the QAM modulation scheme, and waveguide 18 is associated with the quadrature (Q) component of this scheme. A first multi-segment modulator 110 and associated first input signal encoder 120 are disposed along waveguide 16, as shown. A second multi-segment modulator 130 and associated second input signal encoder 140 are similarly disposed along waveguide 18. In order to re-combine the signals along arms 16 and 18, a π/2 phase shift element 135 is disposed at the output of modulator 130 so as to allow for the orthogonal components to be re-aligned.

As shown, the in-phase data bit inputs I0, I1 and I2 are used as inputs to first input signal encoder 120, where in this particular embodiment, first input signal encoder 120 is shown as generating a set of six control signals M0-M5 (more particularly six pair of complementary control signals). This set of six control signals M0-M5 is then used to control a six-segment modulator structure, shown as segments 150 along a first waveguide 16-1 and segments 152 along a second waveguide 16-2. In a similar fashion, a set of quadrature data bit inputs Q0, Q1 and Q2 are used as inputs to second input signal encoder 140, again creating a set of six control signals for segments 154 and 156 disposed along waveguides 18-1 and 18-2, respectively. Again, encoders 120 and 140 are used to map the input signal bits into the "best" set of output signals that over the nonlinearity and attenuation problems associated with silicon-based optical modulators.

Figure 9:
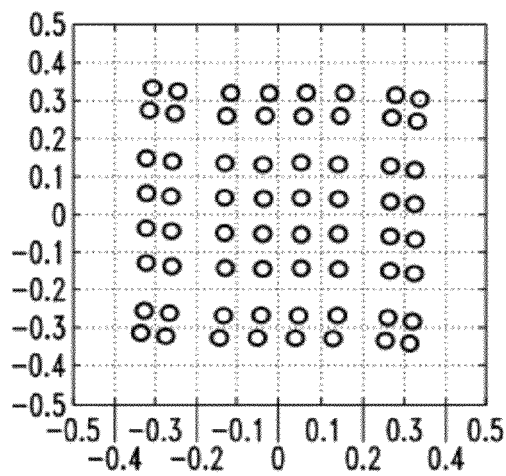
FIG. 9 is a rectangular constellation diagram for QAM-64 utilizing a conventional three-segment modulator of the prior art.

FIG. 9 is a diagram of the prior art constellation diagram associated with QAM-64, using a three segment modulator to directly apply the three-bit input signal (b0, b1 and b2) to the I and Q modulators in an arrangement similar to FIG. 8 (in this case, using only three segments along each modulator). It is to be understood that an "ideal" modulator structure would yield a constellation diagram comprising an array of equally-spaced points. However, the various nonlinear properties of the MZI (i.e., its inherent nonlinear transfer function, as well as the presence of attenuation along the signal path and the nonlinear phase modulation) all contribute to introducing displacements in various ones of the 64 possible data signals with respect to their hypothetical locations. This displacement is particularly problematic for the "outer signals", as indicated in FIG. 9.

Figure 10A:
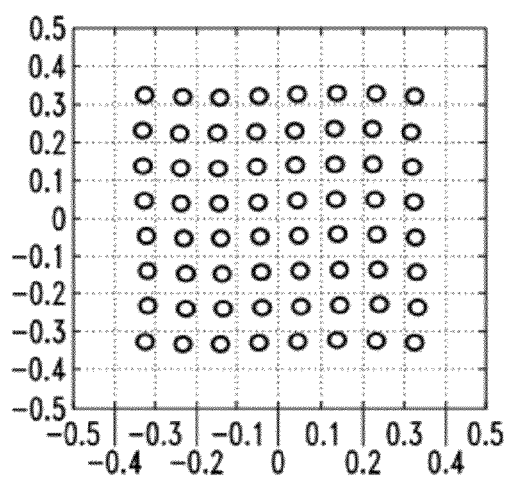
FIG. 10(a) is a QAM-64 diagram associated with using a four-segment MZI and associated input signal encoder formed in accordance with the present invention.
Figure 10B:
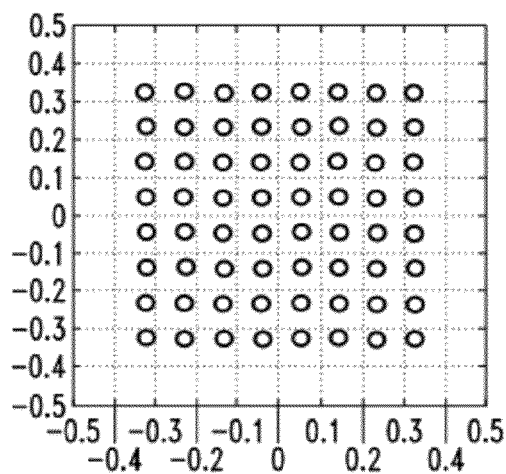
FIG. 10(b) is a QAM-64 diagram associated with using a six-segment MZI and associated input signal encoder formed in accordance with the present invention.

In accordance with the present invention, by increasing the number of segments utilized in the modulator, and judiciously selecting the control signal input pattern supplied by the encoder, the attenuation associated with these signals can be reduced. FIG. 10(a) is a constellation diagram for an embodiment of the present invention utilizing a four segment modulator structure, and FIG. 10(b) is a constellation diagram for an embodiment utilizing a six-segment modulator. The improvement over the three-segment arrangement of the prior art is visible. Indeed, by increasing the number of segments, the error rate in the data recovered from modulated output signal at an associated optical receiver is significantly reduced.

Figure 11:
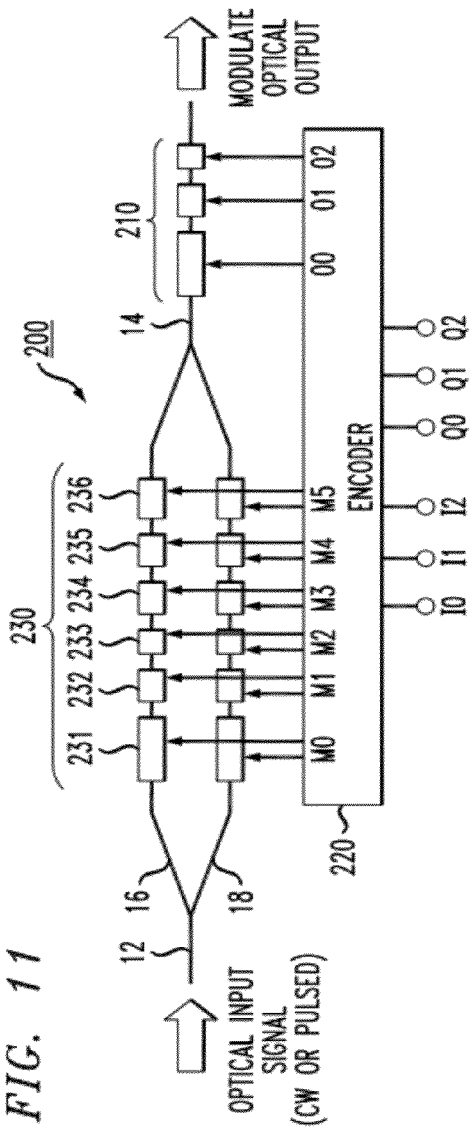
FIG. 11 is a diagram of an alternative embodiment of the present invention, utilizing a single MZI to provide QAM signaling and includes the use of additional segments disposed beyond the output of the MZI to provide additional compensation.

FIG. 11 illustrates an alternative embodiment of the present invention, in this case implementing QAM-64 with a single modulator 200. In order to provide a complete representation of all 64 possible data bits, a set of phase modulation segments 210 are located "outside" of modulator 200 along output signal path 14. As shown, the three in-phase data bits (I0, I1 and I2), as well as the three quadrature data bits (Q0, Q1 and Q2) are applied as inputs to a single encoder 220. The particular embodiment of FIG. 11 comprises a six-segment modulator structure 230, with control signals M0-M5 (and their complements) applied as drive signal inputs to separate segments 231, 232, 233, 234, 235 and 236, respectively, forming modulator structure 230. Encoder 220 thus utilizes the I, Q input signals to create not only the drive signals for the modulator segments 230, but also digital drive signals φ0, φ1 and φ2 for phase modulation segments 210, where the lengths of segments 230 and drive signal patterns are also selected to address attenuation problems associated with the silicon-based optical modulating device.

Although not particularly illustrated, it is to be understood that the embodiment of the present invention as discussed above in association with FIG. 8 may be modified to further include a plurality of phase modulating segments disposed "outside" of modulator 100, along output waveguide 14.

Figure 6A:
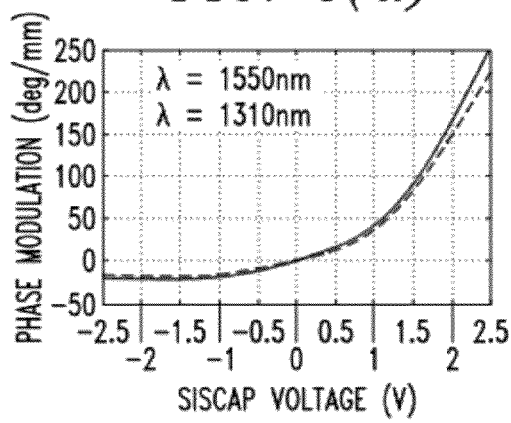
FIG. 6(a) is a graph of the nonlinear phase response of a silicon-based modulating device.
Figure 6B:
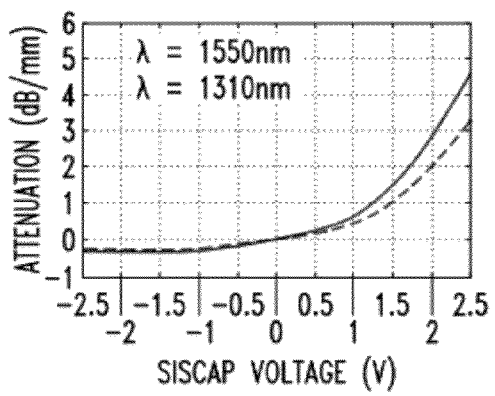
FIG. 6(b) is a graph of the attenuation associated with a silicon based modulating device.
Figure 12:
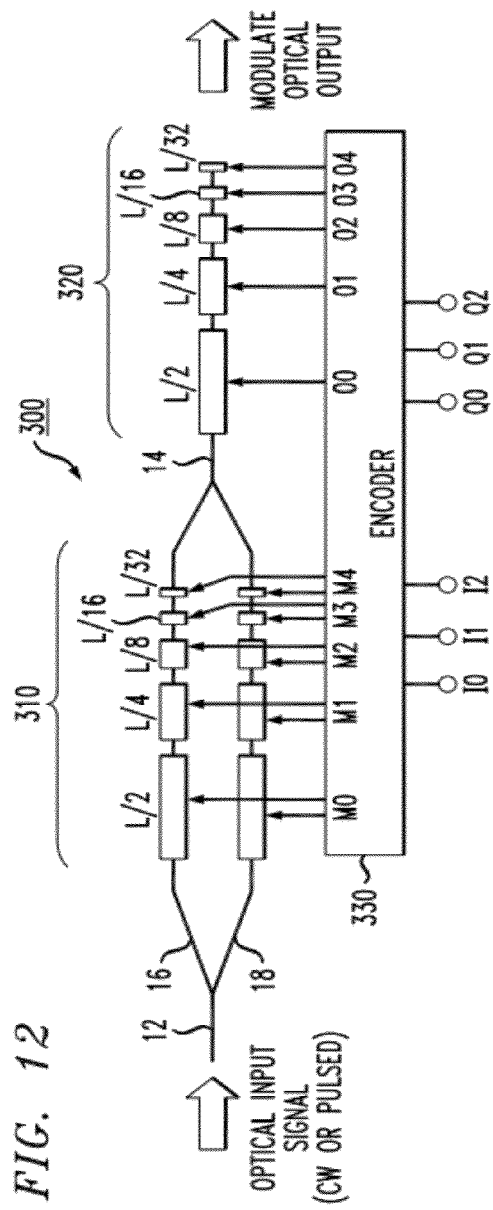
FIG. 12 is an alternative embodiment of the arrangement of FIG. 11, utilizing different lengths of each segment of the modulator structure.

For some design applications, it may be necessary to optimize the length of each segment on an individual basis. Specific silicon-based limitations (such as free-carrier dispersion-based attenuation) are known to be a function of the length of the MZI structure (see, for example, the diagrams of FIGS. 6(a) and (b), which illustration phase modulation and attenuation as a function of the length (mm) of a silicon-based modulating device. However, it may also be advantageous to choose the lengths based on a geometric series. For example, in a five segment embodiment, the lengths may be geometrically related by L/2, L/4, L/8, L/16 and L/32, where L is chosen based on some criteria such as maximum optical modulation amplitude (OMA), extinction ratio, or the like. The specific selected criteria is considered to be a design consideration of the specific implementation and not a requirement of the present invention. FIG. 12 illustrates an alternative arrangement 300 of the embodiment of FIG. 11 utilizing such a scheme for defining the lengths of each modulation segment (both segments 310 "inside" MZI 300 and segments 320 "outside" of MZI 300). In this approach, the modulator segments may be driven in a manner resulting in an effective total length of 31 L/32 in L/32 increments. As with the other arrangements discussed above, a suitably programmed encoder 330 is used to provide a plurality of digital drive signals to the separate segments, shown as a first set of digital drive signals M0-M4 (of complementary form) to segments 310 within MZI and a second set of digital drive signals φ0-φ4 (single-sided) to phase segments 320 disposed along output waveguide 14.

It is to be understood that the encoding technique used in the modulator of the present invention is applicable for a variety of different modulation schemes. Exemplary modulation formats include, but are not limited to, pulse amplitude modulation (PAM-n), which is sometimes referred to in the art as amplitude-shift-keying (ASK), QAM-n (implementing rectangular as well as star constellation diagrams), orthogonal frequency division multiplexing (OFDM), and the like. Indeed, while the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the claims appended hereto.

What is claimed is:

1. A silicon-based optical modulating device for converting an N-bit electrical data signal into a modulated optical output signal, the modulating device formed within a silicon-on-insulator (SOI) structure including a silicon substrate, a buried oxide later disposed over the silicon substrate and a sub-micron thick silicon surface layer (SOI layer) disposed over the buried oxide layer and comprising an input waveguiding section formed within the SOI layer for receiving a continuous wave (CW) optical input signal;

an input optical splitter formed within the SOI layer and coupled to the output of the input waveguiding section for dividing the CW optical input signal into a pair of CW optical signals;

a pair of optical waveguides formed within the SOI la er and coupled to the outputs of the input optical splitter, the pair of optical waveguides forming a pair of modulator arms for supporting the propagation of the pair of CW optical signals, at least one modulator arm partitioned into a plurality of M modulator segments, with each modulator segment comprising a silicon layer disposed in an overlapped arrangement with an oppositely-doped portion of the SOI layer and including a thin dielectric layer disposed therebetween to form a silicon-insulator-silicon capacitance (SISCAP) modulator segment based upon movement of free carriers between the doped silicon layer and the oppositely-doped portion of the SOI layer;

a digital encoder for translating the N-bit electrical data signal into a plurality of M drive signals for the plurality of M modulator segments with $M \geq 2^N/2$, the plurality of M drive signals selected to compensate for nonlinearity and attenuation problems associated with free carrier dis ersion-based modulation within the silicon-based optical modulating device;

an output optical combiner formed within the SOI layer for combining the pair of modulated optical signals into a modulated optical output signal; and an output waveguiding section formed within the SOI layer and coupled to the output of the output optical combiner for supporting the propagation of the modulated optical output signal.

2. A silicon-based optical modulating device as defined in claim 1 wherein each modulator arm is partitioned into a plurality of M modulator segments, the digital encoder providing a plurality of M pairs of drive signals.

3. A silicon-based optical modulating device as defined in claim 2 wherein the plurality of M pairs of drive signals comprise a plurality of M pairs of complementary drive signals.

4. A silicon-based optical modulating device as defined in claim 1 wherein the modulating device further comprises
a plurality of phase modulating segments disposed within the SOI layer along the output waveguiding section and controlled by drive signal outputs from the digital encoder.

5. A silicon-based optical modulating device as defined in claim 1 wherein the plurality of M drive signals comprising a plurality of digital signals.

6. A silicon-based optical modulating device as defined in claim 5 wherein the plurality of digital signals comprise a plurality of CMOS-compatible digital signals.

7. A silicon-based optical modulating device as defined in claim 1 wherein the plurality of modulator segments are configured to exhibit a combined length L selected to provide a predetermined optical modulation amplitude (OMA) in the presence of nonlinearities and attenuation associated with the free-carrier dispersion effect of the silicon-based modulating device.

8. A silicon-based optical modulating device as defined in claim 1 wherein the plurality of modulator segments are configured to exhibit a combined length L selected to provide a predetermined extinction ratio in the presence of nonlinearities and attenuation associated with the free-carrier dispersion effect of the silicon-based modulating device.

9. A silicon-based optical modulating device as defined in claim 1 wherein the plurality of segments are configured to exhibit a combined length L, where the lengths of the individual segments are based on $L/2^n$, n=1, 2, 3, . . . .

10. A silicon-based quadrature-amplitude modulated (QAM) optical device formed within a silicon-on-insulator SOI structure including a silicon substrate a buried oxide layer disposed over the silicon substrate and a sub-micron thick silicon surface layer (SOI layer) disposed over the buried oxide layer, the QAM optical device comprising:
- an input waveguiding section formed within the SOI layer for receiving a continuous wave (CW) optical input signal;
- an input optical splitter formed within the SOI layer and coupled to the output of the input waveguiding section for dividing the CW optical input signal into a pair of CW optical signals;
- a pair of optical waveguide arms formed within the SOI layer and coupled to the outputs of the input optical splitter,
- a first optical waveguide arm of said pair of optical waveguide arms further comprising
  - a first optical splitter creating a first pair of modulator arms for supporting the propagation of a first portion of the CW optical signal, each modulator arm of the first pair of modulator arms partitioned into a first plurality of M modulator segments, with each modulator segment of the first plurality of M modulator segments comprising a doped silicon layer disposed in an overlapped arrangement with an oppositely-doped portion of the SOI layer and including a thin dielectric layer disposed therebetween to from a silicon-insulator-silicon capacitance (SISCAP) modulator segment based upon movement of free carriers between the doped silicon layer and the oppositely-doped portion of the SOI layer;
  - a first digital encoder for translating a QAM data signal into a first plurality of M drive signals for a first plurality of M modulator segments, the first plurality of M drive signals selected to compensate for nonlinearity and attenuation problems associated with free carrier dispersion-based modulation within the silicon-based optical modulating device; and
  - a first optical combiner formed within the SOI layer for combining the modulated optical signals propagating along each modulator arm of the first pair of modulator arms;
- a second optical waveguide arm of said pair of optical waveguide arms further comprising
  - a second optical splitter creating a second pair of modulator arms for supporting the propagation of a second portion of the CW optical signal, each modulator arm of the second pair of modulator arms partitioned into a second plurality of M modulator segments, with each modulator segment of the second plurality of M modulator segments comprising a doped silicon layer disposed in an overlapped arrangement with an oppositely-doped portion of the SOI layer and including a thin dielectric layer disposed therebetween to from a silicon-insulator-silicon capacitance (SISCAP) modulator segment based upon movement of free carriers between the doped silicon layer and the oppositely-doped portion of the SOI layer;
  - a second digital encoder for translating a QAM data signal into a second plurality of M drive signals for a second plurality of M modulator segments, the second plurality of M drive signals selected to compensate for nonlinearity and attenuation problems associated with free carrier dispersion-based modulation within the silicon-based optical modulating device; and
  - a second optical combiner formed within the SOI layer for combining the modulated optical signals propagating along each modulator arm of the second pair of modulator arms;
- a $\pi/2$ phase shift element disposed within the SOI layer at the output of the second optical combiner;
- an output optical combiner formed within the SOI layer for combining the pair of modulated optical signals at the outputs of the first and second optical combiners into a QAM modulated optical output signal; and
- an output waveguiding section formed within the SOI layer coupled to the output of the output optical combiner for supporting the propagation of the QAM modulated optical output signal.

* * * * *